W. DENNIS.
FRICTION CLUTCH.
APPLICATION FILED JUNE 4, 1910.
1,053,163.
Patented Feb. 18, 1913.
2 SHEETS—SHEET 2.
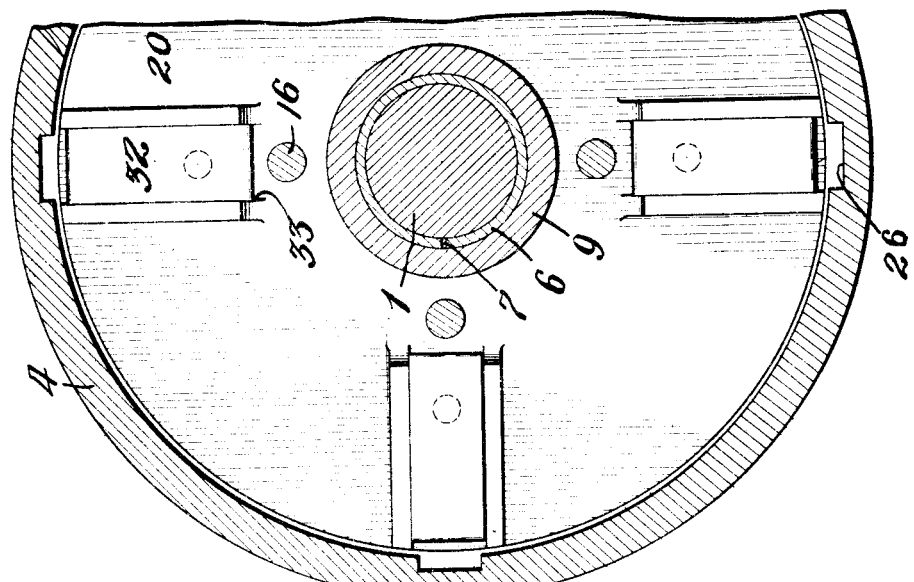
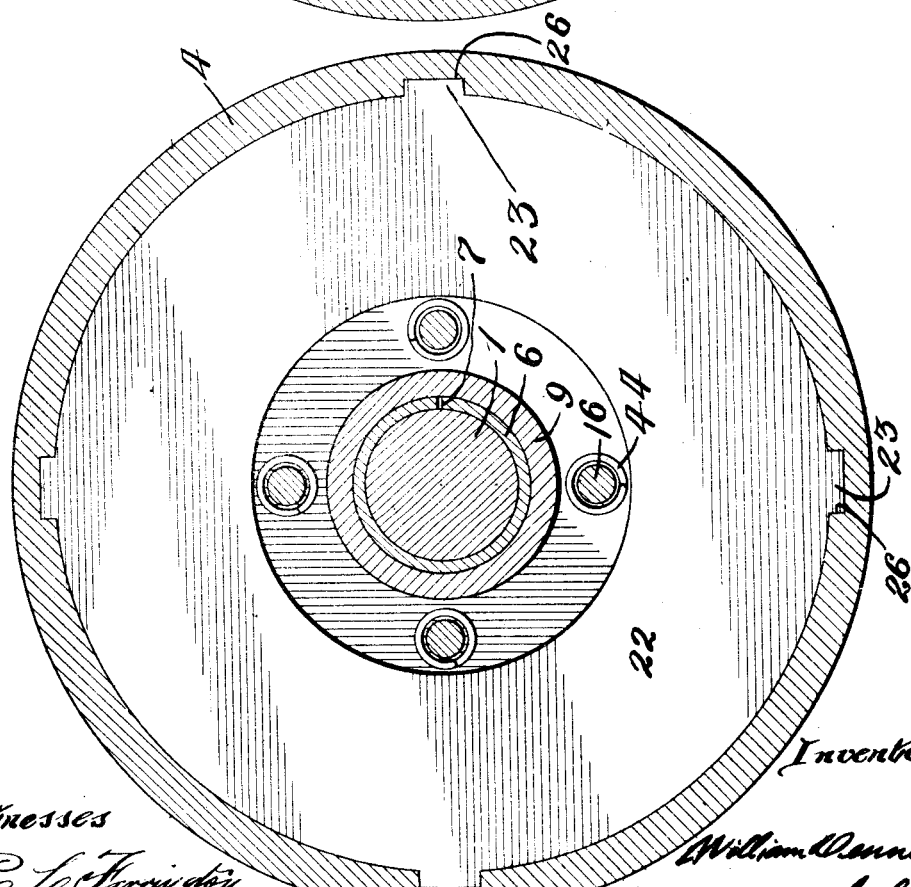
Witnesses
Inventor:
William Dennis
by
Attys.

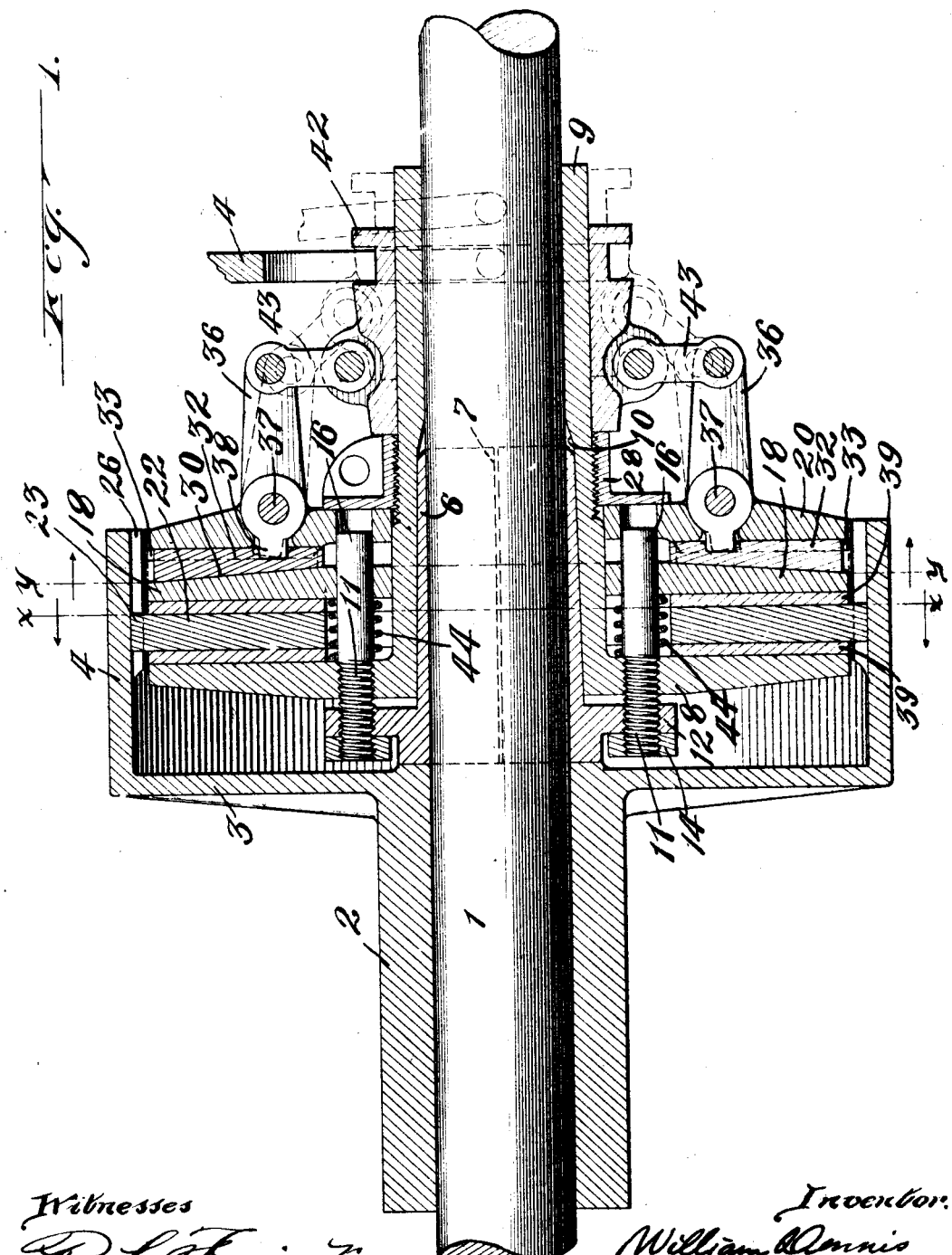

UNITED STATES PATENT OFFICE.

WILLIAM DENNIS, OF MILWAUKEE, WISCONSIN, ASSIGNOR, BY MESNE ASSIGNMENTS, TO VERGES MANUFACTURING CO., OF MILWAUKEE, WISCONSIN, A CORPORATION OF WISCONSIN.

FRICTION-CLUTCH.

1,053,163.   Specification of Letters Patent.   Patented Feb. 18, 1913.

Application filed June 4, 1910. Serial No. 564,957.

*To all whom it may concern:*

Be it known that I, WILLIAM DENNIS, a citizen of the United States, residing at Milwaukee, county of Milwaukee, and State of Wisconsin, have invented new and useful Improvements in Friction-Clutches, of which the following is a specification.

My invention relates to improvements in friction clutches, with especial reference to that type of clutches in which the motion is transmitted from the driving to the driven member through a set of friction disks arranged to move into and out of side pressure contact with each other.

The object of my invention is to provide more effective means for binding the disks together with sufficient pressure to prevent slippage. Also to improve the mechanism structurally, whereby the cutting of spline grooves in the shaft is avoided, and whereby the disks will be readily separated from each other sufficiently to permit of independent motion when the clamping pressure is relieved.

In the following description, reference is had to the accompanying drawings, in which—

Figure 1 is a view, in axial section, of a clutch embodying my invention. Fig. 2 is a sectional view, left hand section, drawn on line *x—x* of Fig. 1. Fig. 3 is a sectional view, right hand section, drawn on line *y—y* of Fig. 1.

Like parts are identified by the same reference characters throughout the several views.

1 is a shaft and 2 is a sleeve mounted thereon and adapted to revolve independently of the shaft. Either the shaft 1 or the sleeve may be considered as the driving member and the other, the driven member of my improved clutch. The sleeve 2 is provided with an outwardly extending disk 3, which carries a rim or housing 4, covering the working parts of the clutch. A tubular wedge member 6 is mounted upon the shaft with one end abutting the sleeve 2, this wedge member being split at 7 and adapted to be bound securely to the shaft 1 with sufficient force to cause it to rotate in unison with the shaft. The inner clutch member 8 is mounted upon a sleeve 9, which is axially movable along the shaft and bears upon the shaft at one end and upon the wedge member 6 at the other end, said sleeve being tapered at 10 where it extends over the end of the tubular wedge member 6. Clamping screws 11 have threaded bearing in the clutch member 8 and extend through suitable apertures in a flange 12 on the member 6, the ends of these screws being provided with nuts 14 which may be adjusted to draw the member 8 toward the flange 12 to bind the tubular wedge 6 upon the shaft. The screws 11 are provided with unthreaded extensions 16, which serve as guides for the gripping member 18 and abutment member 20 of the clutch, being extended into suitable apertures in such members.

An intermediate clutch member 22 is connected to rotate with the rim 4, the member 22 having projections 23, which enter suitable channels 26 in said rim 4, the arrangement being such that the member 22 is free to move axially along the shaft 1 within the rim 4, but is not free to rotate independently of said rim. A flanged collar 28 has threaded engagement with the sleeve 9 and serves to limit outward movement of the member 20. The gripping member 18 is a disk shaped member, preferably provided with a tapered outer surface 30, the outer margin of the disk being slightly thinner than the inner portion. The wedges 32 are mounted in suitable radially extending channels 33 in the inner face of the abutment member 20 and are adapted to bear against the outer face 30 of the gripping member 18. These wedges are tapered inwardly and are actuated by means of levers 36 pivoted at 37 to the abutment member and have short arms 38 engaging suitable notches in the wedges, whereby an inward movement of the projecting power ends of the levers will move the wedges outward radially and thus relieve the pressure of the wedges upon the gripping member 18. A reverse movement of the lever 36 will, of course, move the wedges inwardly, whereupon the gripping member 18 will bind the clutch member 22 between said gripping member and the clutch member 8. The clutch member 22 being surfaced with material 39 having high frictional resistance, it is obvious that motion transmission without slipping may be easily effected.

The levers are actuated by means of a shifting lever 40 of ordinary construction, operatively connected with a collar 42, which is mounted for axial movement upon the sleeve 9 and connected by links 43 with the respective levers 36. When the collar 42 is moved outwardly to the position indicated by dotted lines in Fig. 1, the power end of the lever 36 will move inwardly and adjust the wedges 32 to releasing position. A reverse movement of the collar 42 will adjust the wedges to binding position, in which position they are illustrated in Fig. 1. Springs 44 may be coiled about the pins 16 between the gripping member 18 and the clutch member 8, whereby when the pressure of the wedges 32 is relieved, the member 18 will immediately separate from binding frictional contact with the intermediate member 22. It will of course be understood that when the wedges 32 are in clutch setting position, all the parts will revolve in unison and motion may be transmitted from the shaft 1 to the sleeve 2, or vice versa.

Having thus described my invention, what I claim as new, and desire to secure by Letters Patent is,—

1. A clutch of the described class, comprising the combination of driving and driven members provided with interacting disks relatively movable axially into and out of gripping contact with each other and connected to rotate with the respective members, of an abutment member supported from one of the other members, a set of radially disposed wedges mounted for sliding radial movement on the abutment member, and arranged to bear upon one of said disks, said disk having a bearing surface inclined inwardly and axially into the paths of the wedges, and means for actuating the wedges.

2. A clutch of the described class, comprising the combination with a shaft, a sleeve thereon having a housing, a split wedge sleeve on the shaft within the housing, an axially movable sleeve covering and adapted to compress the wedge sleeve, clamping bolts for drawing the axially movable sleeve upon the wedge sleeve, a set of fixed and axially movable friction disks supported from said axially movable sleeve and apertured to receive the clamping bolts, an intermediate friction disk operatively connected to rotate with said housing, and means for binding said disks together.

3. A clutch of the described class, comprising the combination with a shaft, a sleeve thereon having a housing, a split wedge sleeve on the shaft within the housing, an axially movable sleeve covering and adapted to compress the wedge sleeve, clamping bolts for drawing the axially movable sleeve upon the wedge sleeve, a set of fixed and axially movable friction disks supported from said axially movable sleeve, and relatively movable along said shaft, another set of friction disks operatively connected to rotate with said housing, and means for binding said disks together, comprising an abutment member mounted upon the axially movable sleeve, a set of levers pivotally supported thereby and a set of wedges mounted for radial movement upon the abutment member and operatively connected with said levers, and means for actuating the levers substantially as described.

4. A clutch having driving and driven members, in combination with a set of motion transmitting friction disks operatively connected to rotate with the respective members of an abutment member radially movable clamping devices for binding said disks together, and shifting mechanism for operating said wedges, mounted on the abutment member, one of said friction disks having a tapered outer surface and said clamping devices comprising wedges movable along said surface between it and the abutment member.

5. A clutch having driving and driven members, in combination with a set of motion transmitting friction disks operatively connected to rotate with the respective members of an abutment member, radially movable clamping devices for binding said disks together, and shifting mechanism for operating said wedges, mounted on the abutment member, one of said friction disks having a tapered outer surface and said clamping devices comprising wedges movable along said surface between it and the abutment member, said abutment member having radial channels in which said wedges are seated.

In testimony whereof I affix my signature in the presence of two witnesses.

WILLIAM DENNIS.

Witnesses:
  LEVERETT C. WHEELER,
  LYMAN G. WHEELER.